United States Patent Office 2,830,654
Patented Apr. 15, 1958

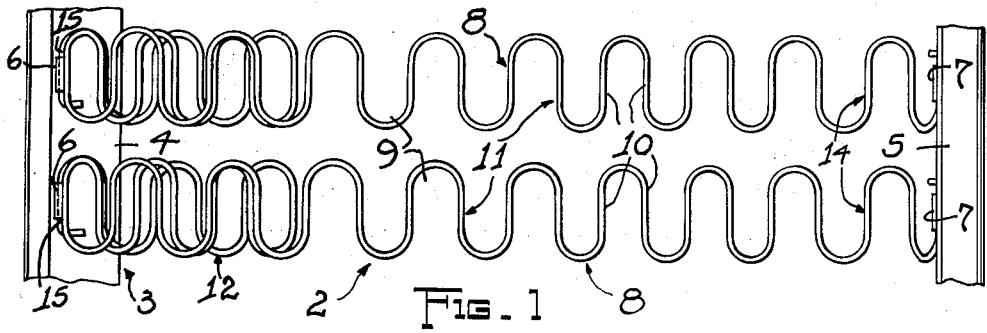

2,830,654
WIRE SPRING STRUCTURE

William H. Neely, Cleveland, Ohio, assignor to The Universal Wire Spring Company, Bedford, Ohio, a corporation of Ohio Application June 11, 1956, Serial No. 590,732

3 Claims. (Cl. 155—179)

This invention relates in general to wire spring seat structures for upholstered furniture, cushioned automobile seats or the like, which embody a frame mounting crosswise thereof a plurality of elongated flat wire springs of sinuous or similar shape. The wire springs of these wire spring seat structures generally include a crowned seating portion, a downwardly and rearwardly extended V-shaped front supporting arm and an upwardly and rearwardly extended rear supporting arm, and have the supporting arms attached to front and rear rails of open frames in a preloaded cantilever-like fashion which effects a stiffening of the spring seating portions, interferes with shaping of the seating portions to loads placed thereon and prevents proper reaction of the springs to normal, excessive or shock loads.

The primary object of the present invention is the provision of an improved wire spring seat structure of the type referred to, in which the rear supporting arms of sinuously corrugated wire springs are connected with the rear rail of a frame by controlled pivotal couplings effected by pivoting end cross members of the rear supporting arms of the springs to the rear rail of the frame and yieldingly counteracting pivotal movements of these end cross members by providing same with extensions angularly related to the plane of the rear supporting arms at angles preventing face-to-face contact of the rear supporting arms with the rear rail when the wire spring seat structure is subjected to normal, excessive or shock loads.

Another object of the invention is the provision of an improved wire spring seat structure of the type referred to, in which the sinuously corrugated wire springs have their front supporting arms extended in cantilever-like fashion from the front rail and dimensioned to subject the spring seating portions to tensile stresses under normal, excessive or shock loads of the wire spring seat structure, and in which the rear supporting arms are pivotally coupled with the rear rail by controlled pivotal connections of the type described above to effect cooperating action of front and rear spring supporting arms in preventing face-to-face contact of the rear supporting arms with the rear rail under normal, excessive or shock loads of the wire spring seat structure.

With the above and other objects in view, the invention has certain other marked superiorities which clearly distinguish it from presently known structures and arrangements of this type. These improvements or characteristics, embodying certain novel features of construction and design, are clearly set forth in the appended claims, and the preferred form of embodiment of the invention as hereinafter shown with reference to the accompanying drawings forming part of the specification.

In the drawings:

Fig. 1 is a fragmentary plan view of a frame-mounted wire spring seat structure constructed in accordance with the invention.

Fig. 2 is a side view of the wire spring seat structure shown in Fig. 1.

Fig. 3 shows enlarged fragmentary side and front views of the rear portion of the wire spring seat structure in unloaded condition.

Fig. 4 shows enlarged fragmentary side and front views of the wire spring seat structure under normal loads; and Fig. 5 shows enlarged fragmentary side and front views of the wire spring seat structure under shock loads.

Referring now in detail to the exemplified form of the invention shown in the drawings, reference numeral 2 represents a fragmentarily shown automobile seat spring construction, the frame 3 of which embodies a front rail 4 and a rear rail 5 having substantially U-shaped cross section. Rails 4 and 5 are formed with spaced, hook-shaped struck-up portions 6 and 7, respectively, permitting removable attachment of elongated, sinuously corrugated wire springs 8 to the rails 4 and 5 crosswise of frame 3. Each of the springs 8, which embody oppositely extended left and right-handed loops 9 connected with each other by straight cross members 10, includes a crowned seating portion 11, a rearwardly and downwardly extended V-shaped front supporting arm 12, and a rearwardly and upwardly extended rear supporting arm 14. V-shaped front supporting arm 12 has its end cross member 15 on lower lever portion 16 engaged with a hook-shaped struck-up portion 6 of front rail 4 and is seated by end loop 17 of lower lever portion 16 on front rail 4, and rear supporting arm 14 has its end cross member 19 pivoted to hook-shaped struck-up portion 7 of rear rail 5 and is suspended therefrom by a controlled pivotal coupling to be described hereinafter.

This controlled pivotal coupling of rear supporting arm 14 on rear rail 5 is effected by a lateral extension 20 on end cross member 19, which extension is acute angularly related to the plane of end loop 21 of rear supporting arm 14. Extension 20 is engaged with the seating surface 22 of rear rail 5, torsionally counteracts pivotal movement of rear supporting arm 14 toward seating surface 22 and spaces end loop 21 from seating surface 22. The controlled pivotal coupling, which is partly controlled by the previously described support of V-shaped front supporting arm 12 on front rail 4, permits predeterminable control of the seating portion 11 of spring 8 for normal, excessive or shock loads of the wire spring seat structure and depends on the angular relationship of extension 20 with respect to the plane of end loop 21. This predeterminable pivotal coupling also is controlled by shape and form of rear supporting arm 14, its angular relation to seating surface 22 and the cantilever-like support of front supporting arm 12 on front rail 4, the V-shape of which permits differentiation in length of upper lever portion 23 with respect to lower lever portion 16 to permit building up of seating portion 11 of spring 8.

Controlled pivotal movement of rear supporting arm 14 on rear rail 5 is shown in Figs. 3 through 5 of the drawings, disclosing in Fig. 3 the shape of the rear supporting arm 14 in pretensioned state of the wire spring 8, in Fig. 4 the shape of the rear supporting arm 14 in normally loaded state of the wire spring 8, and in Fig. 5 the shape of rear supporting arm 14 in shock loaded state of the wire spring 8. Figures 3 through 5 also show the angle between end loop 21 and extension 20 as decreasing with an increase in the load, i. e., angle 26 in Fig. 4 is smaller than angle 25 in Fig. 3, and angle 27 in Fig. 5 is smaller than angle 26 in Fig. 4 and angle 25 in Fig. 3. The actual size of angles 25, 26 and 27 depends on the tensional build up of torsional resistance in pivotally supported end cross member 19 and adjacent cross members of rear supporting arm 14, but these angles are chosen to avoid face-to-face contact of end loop 21 with rear rail 5 when the wire spring seat structure is under normal, excessive or shock loads.

Having thus described my invention, what I claim is:

1. In a combined frame and spring seat structure, a frame including front and rear spring supporting means, and a spring structure of sinuously corrugated wire springs, each of said springs including a resting portion and supporting arms extending from opposite ends of said resting portion, said spring having their front supporting arms in cantilever-like arrangement attached to the front supporting means of said frame and their rear supporting arms by spring-controlled connections pivotally attached to the rear supporting means of said frame, said spring-controlled connections having sufficient spring action to effect continuous spring controlled pivotal coupling of the rear supporting arms of the spring structures to said rear supporting means of said frame under normal and shock loading of said springs.

2. A combined frame and spring seat structure as described in claim 1, wherein the front supporting arms of the sinuously corrugated wire springs are extended below the resting portion of the wire springs, and wherein the rear supporting arms of the wire springs embody end cross members pivotally coupled with the rear supporting means of the frame and end portions extended from said end cross members in planes acute angularly related to the planes of the rear supporting arms of the springs.

3. In a combined frame and spring seat structure, a frame having front and rear supporting rails and a spring seat structure of sinuously corrugated wire springs, each of said wire springs including a sinuously corrugated resting portion and sinuously corrugated front and rear supporting arms extending from opposite ends of the resting portion, said wire springs having their front supporting arms in cantilever-like fashion attached to the front rail and their rear supporting arms by end cross members pivotally connected to the rear rail, each of the rear supporting arms of the wire springs including an extension at the free end of the end cross member thereof, said extension disposed in a plane angularly related to the plane of the rear supporting arm and in continuous contact with the rear rail to yieldingly tilt the rear supporting arm away from the rear rail at an angle of a magnitude sufficient to yieldingly space the rear supporting arm from the rear rail under normal and shock loading of the springs.

References Cited in the file of this patent

UNITED STATES PATENTS 2,440,001    Blumensaadt _____ Apr. 20, 1948